United States Patent [19]

Taylor et al.

[11] Patent Number: 4,713,299

[45] Date of Patent: Dec. 15, 1987

[54] MODIFIED MELAMINE RESIN FOR USE IN DECORATIVE LAMINATES

[75] Inventors: Arthur R. Taylor, Billingham, England; Dudley Wulfekotter, Cincinnati, Ohio

[73] Assignee: Formica Corporation, Wayne, N.J.

[21] Appl. No.: 835,567

[22] Filed: Mar. 3, 1986

[30] Foreign Application Priority Data

Mar. 5, 1985 [GB] United Kingdom ................ 8505602

[51] Int. Cl.$^4$ ...................... B32B 23/08; B32B 27/42
[52] U.S. Cl. ................................ 428/526; 156/307.1; 156/307.4; 156/310; 428/525; 428/530; 428/531; 428/537.5
[58] Field of Search ............... 525/517, 406; 428/526, 428/530, 531, 537.5; 156/307.1, 307.4, 310

[56] References Cited

U.S. PATENT DOCUMENTS

| | | | |
|---|---|---|---|
| 4,150,194 | 4/1979 | Watts et al. | 428/531 |
| 4,328,326 | 5/1982 | Piesch et al. | 525/509 |
| 4,473,613 | 9/1984 | Jaisle et al. | 428/220 |

FOREIGN PATENT DOCUMENTS 851295  3/1958  United Kingdom .

*Primary Examiner*—Theodore E. Pertilla
*Attorney, Agent, or Firm*—Michael O. Warnecke; Donald A. Peterson

[57] ABSTRACT

Melamine resins modified with a mixture of a polyalkylene glycol and an alkylated methylolmelamine, paper sheets impregnated therewith, decorative laminates prepared from said sheets and a method of producing said laminates are disclosed.

10 Claims, No Drawings

MODIFIED MELAMINE RESIN FOR USE IN DECORATIVE LAMINATES

BACKGROUND OF THE INVENTION

1. Field of the Invention

The invention relates to novel melamine resins modified with a mixture of polyalkylene glycol and an alkylated methylomelamine, paper sheets impregnated therewith and decorative laminates prepared therefrom and methods of making the same.

2. Description of the Related Art

Conventional high pressure decorative laminates are produced by heat and pressure consolidating a laminate assembly comprising, in superimposed relationship, a plurality (e.g., 2–9) of phenol/formaldehyde resin impregnated saturating kraft paper sheets, a melamine/formaldehyde resin impregnated decor sheet and, optionally, a melamine/formaldehyde resin impregnated overlay sheet in a multi-opening press at from about 120°14 250° C. and 6.9 MPa–11.0 MPa. The laminate assemblies are pressed, in back-to-back relationship, with the aid of release sheets and press plates, such that from about 8–35 laminates can be produced from each press opening during each press cycle.

Recently, there has been introduced decorative laminates which are produced on low pressure, i.e., 0.7 MPa to 1.7 MPa, continuous laminating machines. These laminates are prepared by continuously subjecting rolls of superimposed papers to heat and pressure consolidation in a double-belt press, see U.S. Pat. No. 4,473,613, hereby incorporated herein by reference.

High pressure, i.e., 3.4 MPa to 5.2 MPA, continuous production is currently being actively investigated by many laminate producers, whereby an increased number of kraft paper core sheets may be employed so as to prepare laminates whose thickness is substantially equivalent to those laminates produced for many years via the use of multi-openings presses.

The conventional laminates produced by multi-openings presses are normally from about 0.5–10 mm in thickness whereas the continuous laminates are normally from about 0.2–1.3 mm in thickness.

While the conventional laminates have found astounding success as decorative surfaces for countertops, furniture, wall panels, etc., and the future is seen to be bright for low pressure, continuously produced laminates for the same and other service applications, the need is still present for the improvement of these laminates, especially in the area of radial crack resistance and surface resistance to boiling water.

SUMMARY OF THE INVENTION

Conventional high pressure decorative laminates, continuously produced low pressure laminates and continuously produced high pressure laminates can now be produced having radial crack resistance and surface resistance to boiling water by impregnating either or both of the decor sheet or the optional overlay sheet of such laminates with a resin composition blend produced from a melamine/formaldehyde resin and a mixture of an alkylene glycol and an alkylated methylolmelamine. The decor sheet and/or the overlay sheet are impregnated with the resin composition utilizing only a one pass treatment thereby obviating the need for at least two treatments, a practice heretofore deemed necessary by most laminate manufacturers.

The unique aspects of the present invention reside in the use of a specific melamine/formaldehyde resin composition to impregnate the decor and/or overlay sheets of the laminates, paper sheets impregnated with such resin composition, decorative laminates produced from said sheets and a method for the preparation of said laminates.

The use of polyalkylene glycols to enhance the postforming of decorative laminates is well known as evidenced by U.S. Pat. Nos. 4,405,690 and 4,093,579 as well as British Pat. No. 851295. However, these patents are silent with regard to the incorporation of an alkylated methylolmelamine into the impregnating resin formulation and, additionally, employ concentrations of polyalkylene glycols outside the range employed in producing the compositions and laminates disclosed and claimed herein. High levels of polyalkylene glycols, as taught by the prior art, cause the formation of cloudiness or poor resistance to boiling water, detriments which are overcome by the present use of the polyalkylene glycolalkylated methylolmelamines. The presence of the alkylated methylolmelamine enables the incorporation of higher levels of the polyalkylene glycol into the ultimate laminate without the attendant cloudiness and poor surface resistance to boiling water evidenced by prior art laminates, and also improves dimensional stability and minimizes warp due to changing climate.

Additionally, the unique compositions of the present invention exhibit a better flow when impregnated into the decor and/or overlay sheets than most conventional laminating resins and enhance the radial crack resistance of the laminates particularly when using contact adhesives to bond the laminates to a secondary substrate surface, e.g., particleboard.

DESCRIPTION OF THE INVENTION INCLUDING PREFERRED EMBODIMENTS

The present invention is directed to a novel laminating resin composition comprising, a blend of, (1) from about 35% to about 98%, by weight, based on the total solids of the composition, of a melamine/formaldehyde resin having a ratio of formaldehyde to melamine of from about 1.1:1 to about 3.0:1, respectively, and (2) from about 2% to about 65%, by weight, based on the total solids of the composition, of a mixture of (A) a polyalkylene glycol having the formula

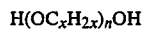

wherein x is an integer of 2–4, inclusive, and n is an integer such that the glycol has a weight average molecular weight of from about 200 to about 1200, and (B) an alkylated methylolmelamine having the formula

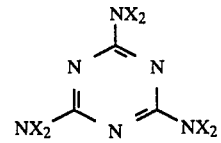

wherein each X is, individually, hydrogen or CH$_2$OR, R is hydrogen or an alkyl group of 1–4 carbon atoms, inclusive, at least 2 X's are CH$_2$OR, and at least one R is an alkyl group, the ratio of A:B ranging from about 2.5:1 to about 0.3:1, respectively, (C) from about 0% to about 3.0%, by weight, based on the total solids of the composition, of an acid catalyst, (D) from about 0% to about 0.5%, by weight, same basis, of a surfactant, (E) from about 0% to about 2.0%, by weight, same basis, of an abrasive material and (F) from about 0% to about 4.0%, by weight, same basis, of a flow promotor.

The present invention is also directed to a cellulosic paper sheet having impregnated therein from about 15% to about 80%, by weight, based on the weight of the sheet, of the above-described composition, heat and pressure consolidated laminates comprising:

(I) a substrate, (II) a decor sheet, and, optionally, (III) an overlay sheet wherein at least one of (II) and (III) is impregnated with said novel composition and a method of preparing said laminate wherein an assembly of the above components (I), (II) and (III), in superimposed relationships, is heat and pressure consolidated.

With regard to the novel compositions of the present invention, the melamine/formaldehyde resin (Component 1) is prepared so as to have a formaldehyde to melamine ratio of about 1.1:1 to about 3.0:1, preferably, from about 1.6:1 to about 2.5:1, respectively, and may be prepared in accordance with those skilled in the art. Preferred concentrations of the melamine/formaldehyde resin in the compositions may range from about 50% to about 80%, by weight.

Component 2 of the novel compositions of the present invention may be present therein in preferred amounts ranging from about 20% to about 50%, by weight. The polyalkylene glycols useful as Element A of Component 2 are well known to those skilled in the art, see U.S. Pat. No. 4,228,055. The preferred polyaklylene glycols are those wherein the alkylene glycols are those wherein the alkylene group is ethylene, i.e., x=2, and n is such that the weight average molecular weight ranges from about 400 to about 800, more particularly, 600. The alkylated methylolmelamines useful herein as Element B of Component 2 are equally well known in the art, e.g., see U.S. Pat. No. 4,158,652. The preferred alkylated methylolmelamines are those wherein R is a methyl group, and about half of the X groups are $CH_2OR$ groups. Ratios of Element A to Element B ranging from about 1.5:1 to about 0.5:1 are also preferred.

Component C, the acid catalyst, is preferably employed in amounts of at least about 0.1%, by weight. Examples of suitable acid catalysts include oxalic acid, formic acid, magnesium bromide, sulfuric acid, citric and, p-toluene sulfonic acid, complexes of p-toluene sulfonic acid and 2-amino-2-methyl-1-propanol and the like.

Component D, the surfactant, is also preferably employed in amounts of at least about 0.1%, by weight. Suitable surfactants include nonyl-phenol ethoxylates of average degrees of oxylation of 9-10, alkylpolyoxyalkylene ethers, nonionic alkylaryl polyether alcohols and the like.

Component E, the abrasive material, may preferably be employed in amounts of at least about 0.5%, by weight, and includes such materials as aluminum oxide, barium sulfate, cerium oxide, silicon carbide, silica, alumina, etc. Particle size of these abrasive materials should range from about 5 to about 40 microns.

Suitable flow promotors, Component F, include phenyl cellosolve, glycerine, o-p-toluene sulfonamides, and the like in preferred amounts of at least about 1.0%, by weight.

It should be understood that the inclusion of any of the optional, but preferred, ingredients in the resin compositions of the present invention, i.e., Components C-F, necessitates the proportionate change of one or more of the other components thereof such that the total concentration of the components in the composition equals 100%.

The above-described resin compositions are used to impregnate cellulosic paper sheets which sheets are then employed as the decor and/or overlay sheets in the production of the novel decorative laminates hereof. The resin is preferably impregnated into the cellulosic paper sheets in amounts ranging from about 25% to about 65%, by weight.

The above-described resin impregnated paper sheets are particularly suited for the continuous and/or low to medium pressure production of decorative laminates without the need for cooling under pressure as is required using conventional high pressure laminating resins.

In producing the decorative laminates of the present invention, the substrates, i.e., Ingredient (I), may be those saturating kraft paper sheets generally recognized as useful by those skilled in the art. They have a basis weight ranging from about 120-270 $g/m^2$. They are employed in the continuous, low pressure systems in amounts ranging from about 1-3 sheets, in the continuous, medium to high pressure systems in amounts ranging from about 1-5 sheets and in the conventional high pressure systems in amounts ranging from about 2-15 sheets. The kraft paper may comprise any known kraft paper, e.g., bleached kraft, unbleached kraft, pigmented kraft, etc., and may be non-creped or X-creped.

When producing conventional high pressure decorative laminates wherein the decor and/or overlay sheets thereof are impregnated with the novel resin composition of the present invention, i.e., at pressures of about 6.9 MPa to 11.0 MPa, the kraft core sheets are impregnated with conventional water-soluble or solvent soluble phenolic resins known to those skilled in the art. These resins comprise the reaction product of phenol and formaldehyde at a mole ratio of about 1:1 to about 1:2.5, respectively. They are liquid resins of the resole type. All or part of the core paper sheets in the conventional high pressure laminates hereof may be replaced by layers of air-laid fibers such as taught in U.S. Pat. No. 4,435,234. The core paper sheets should be impregnated with the phenol resin in amounts ranging from about 20-55%, by weight, based on the resin solids.

When producing laminates continuously at a pressure ranging from about 3.4 MPa to 5.2 MPa, the above described phenol resins or a blend of the above-described water-soluble phenol resins and a conventional, water soluble, melamine/formaldehyde resin can be employed. These melamine/formaldehyde resins have a mole ratio of melamine to formaldehyde of from about 1:1 to about 1:3, respectively, and are employed in the blends with the phenol resins in amounts ranging from about 25-35%, by weight, as aqueous solutions having about 45-55% solids, the remainder, i.e., 65-75%, being the phenol resin, as an aqueous solution of 60-70% solids.

When producing laminates continuously at a low pressure, i.e., at from 0.7 MPa to 1.7 MPa, the resin composition utilized to impregnate the kraft core sheets is that disclosed in U.S. Pat. No. 4,473,613, hereby incorporated herein by reference. Generally, this resin composition comprises a blend of a phenol/formaldehyde resin (as above set forth), a cross-linking acrylic resin and an optional melamine/formaldehyde resin (as discussed immediately above re the medium pressure continuous laminates). Preferred cross-linking acrylic resins include those sold by Rohm and Haas Company and identified as Rhoplex ®HA-12 and TR-934. Other useful acrylic resins include Hycar ®2600 X 138 and Hycar ®26171 sold by B. F. Goodrich. When employing more than two kraft core sheets, the acrylic resin can be omitted from the blend when the melamine/formaldehyde resin component is used.

Various additives are preferably added to any of the resin compositions with which the kraft paper sheet or sheets are impregnated in order to assure optimum results. For example, urea can be present in an amount ranging from about 0.25–1.50%, based on the total weight of the solution, for the purpose of stabilizing the mixture. Release agents, defoamers, and catalyst blocking agents can also be added. Acid catalysts, or other agents, used to assure complete curing of the resins during lamination may also preferably be added. Such materials as oxalic acid, diammonium hydrogen phosphate, ammonium nitrate, sulfuric acid, citric acid, p-toluene sulfonic acid, hexakismethoxymethyl melamine and the like, in amounts ranging from about 0.5 to 10.0%, based on the weight of the mixture, may be included to increase effectiveness. After impregnation, the kraft paper in the form of sheets or rolls can be dried and stored or used as such upon removal from the impregnation bath.

The decor and overlay sheets useful herein are also those generally employed in the production of conventional high or low pressure laminates. The decor sheets can be printed papers, pigmented papers, etc., and the overlay sheets may contain α-cellulose which, upon consolidation, become transparent. Generally the decor sheets should have basis weights ranging from about 40–160 g/m$^2$ and the overlay sheets should have basis weights ranging from about 15–40 g/m$^2$.

As with the phenol resin system, various additives may be added to the resins impregnated into the decor sheets in order to optimize their impregnation or other properties. Such materials as catalyst blocking agents, wetting agents, thickeners and dispersing agents fall within the category of useful additives. Since abrasive particles are includable in the impregnating resin, a thickener may be used to hold the particles in suspension in the aqueous solution of resin.

When the producing laminates continuously, the impregnation of the decor sheet, the overlay and the kraft core sheet or sheets is preferably conducted continuously from rolls of these papers. Upon passing through the impregnation baths, the sheets are preferably dried in a suitable hot air drying oven and rewound into rolls useful as feeds to the heat and pressure consolidation stage of the laminate production.

When the laminates are produced in a continuous manner, the decor and core sheets, impregnated as described above, optionally in conjunction with the overlay sheet, are preferably fed continuously in correct juxtaposition between heated belts of a double-belt press. A conventional laminating texturizing release sheet may be interposed between the uppermost sheet and the belt. The release sheet may be rolled and reused upon exiting the press. When no release sheet is used, the belt can be pretreated with a suitable release agent. Pressure is exerted against the back of the belts and through them to the sheets being laminated. The sheets are held and transported by the belts while being heated to a temperature ranging from about 120°–250° C. and pressure consolidated at a pressure less than about 5.5 MPa. Means of exerting pressure in the belt press is usually hydraulic, seals being used to contain the pressure medium, usually oil or air. Alternatively, the laminates can be heat and pressure consolidated in a batch process utilizing conventional laminating presses operating at pressures below 5.5 MPa. Upon exiting the press, the consolidated laminate is separated from the release paper, if used, passed over cooling rolls when a continuous press is used and sent to a sanding station where the back side is lightly sanded. From the sander, the laminate is edge trimmed and readied for shipment to the consumer.

During the continuous laminate production, a reinforcing member may be positioned between the decor sheet and the backmost kraft paper sheet in order to toughen the ultimate laminate produced. The reinforcing member is preferably positioned immediately below the decor sheet. It provides tear-resistance by inhibiting self propagation of any notch, edge crack or tear that may occur during normal handling or machining of the laminate. When the reinforcing member is used it requires no change in the resin treatment of the other laminate components or the laminating press cycle. The reinforcing member, usually employed in the form of a gossamer veil, does not require resin impregnation before use. Because of its light weight, it does not contribute any material thickness to the laminate nor does it alter the surface appearance or properties thereof. A preferred reinforcing member is a veil of spunbonded polyester fiber having a thickness of 0.05–0.1 mm, a weight of 5–20 g/m$^2$ and sold by E. I. DuPont de Nemours & Co. under the name Reemay ®. Other useful materials include veils or webs of the above thickness and weight made from glass fiber, thermoplastic filaments, etc., or papers made of parchmentized cellulose, vulcanized fiber and the like.

The following examples are set forth for purposes of illustration only and are not to be construed as limitations on the present invention except as set forth in the appended claims. All parts and percentages are by weight unless otherwise specified.

EXAMPLE 1

To a suitable vessel are added 65.9 parts of a melamine/formaldehyde resin having a formaldehyde to melamine ratio of 1.65/1. At room temperature, under agitation, are added 18.7 parts of a commercially available, partially methylated trimethylolmelamine and 11.9 parts of polyethylene glycol having a molecular weight of 600. 0.2 part of nonionic ethylene oxide adduct-alkyl polyoxyalkylene ether as a surfactant is then added. To the resultant solution, are added 1.0 part of aluminum oxide precision lapping powder as slurry and 2.4 parts of a 1/1 molar blend of p-toluene sulfonic acid and diisopropylamine as catalyst. The resultant resinous composition is designated Resin A. Properties thereof are set forth in Table I, below.

EXAMPLE 2

The procedure of Example 1 is again followed except that 55.4 parts of the melamine/formaldehyde resin, 25.0 parts of the partially methylated trimethylolmelamine, 15.9 parts of the polyethylene glycol and 2.5 parts of the catalyst are employed. The resultant resin is designated Resin B. Properties there of are set forth in Table I, below.

EXAMPLE 3

The procedure of Example 1 is again followed except that 66.4 parts of the melamine/formaldehyde resin, 12.0 parts of the partially methylated trimethylolmelamine, 19.0 parts of the polyethylene glycol and 1.4 parts of a blend of p-toluene sulfonic acid and 2-amino-2-methyl-1-propanol (catalyst) are used. The resultant resin is designated Resin C. Properties thereof are set forth in Table I, below.

TABLE I

|  | 1 Resin A | 2 Resin B | 3 Resin C |
|---|---|---|---|
| Specific Gravity (25° C.) | 1.2 | 1.2 | 1.2 |
| Viscosity (Cps @ 25° C.) | 90 | 105 | 90 |
| ph | 7.2 | 7.1 | 7.3 |
| Solids | 57 | 61 | 57 |
| Stroke Cure (105° C.) min | 2–3 | 3–4 | 3–4 |
| Water Tolerance (%) | 50 | 50 | 50 |
| Shelf Life, Hrs. | 16 | 16 | 24 |
| Sunshine Gel Time, Min | 5 | 4.6 | 5.2 |

EXAMPLES 4–20

In the following examples, as set forth in Table II, in each instance, the core is produced from a roll of kraft paper (basis weight 150 g/m$^2$) impregnated with the following resin formulation:

| Component | % by weight |
|---|---|
| 67% solids aq. solution of phenolic resin (Phenol to Formaldehyde ratio = 1:1.75) | 45.69 |
| Water | 11.42 |
| 50% solids aq. solution of melamine resin (melamine to formaldehyde ratio = 1:2) | 19.04 |
| 45% solids aq. emulsion of a commercially available acrylic resin | 19.04 |
| Mold release agent | .95 |
| Defoamer | .05 |
| Catalyst (para-toluene sulfonic acid plus blocking agent) | 3.81 |

The decor paper is impregnated as a roll with the resin composition as set forth in Table II.

The impregnated roll of decor paper is slightly unrolled and the unrolled area is placed atop a slightly unrolled area of the above described impregnated kraft paper roll. The two rolls are fed in such superimposed relationship between the belts of a double belt press.

The pressure applied is 1.38 MPa. The laminate recovered from the continuous press is lightly sanded on its back side and edge trimmed. The properties of the resultant laminate are determined.

In Examples 4C–9C and 14C–17 the melamine/formaldehyde resin has an M/F ratio of ½, the catalyst is a blend of p-toluenesulfonic acid and 2-amino-2-methyl-1-propanol (also Ex. 18) and the surfactant is an ethylene oxide adduct of nonyl phenol. In Examples 10C–13C and 18–20, the melamine/formaldehyde resin is that of Example 1. The catalyst in Examples 10C and 11C is a blend of p-toluenesulfonic acid in isopropanol with triethanolamine (2/1) while in Example 12C, 13C and 19–20, it is a blend of p-toluenesulfonic acid and diisopropylamine. The surfactant in Examples 10C and 11C is a commercially available octylphenoxypolyethoxy ethanol, and in Examples 12C and 18–20 it is a nonionic ethyleneoxide adduct of an alkylpolyoxyalkylene ether.

TABLE II

| Example No. | 4C | 5C | 6C | 7C | 8C | 9C | 10C | 11C | 12C | 13C |
|---|---|---|---|---|---|---|---|---|---|---|
| Resin Solid % | | | | | | | | | | |
| MF Resin | 68.7 | 63.2 | 68.3 | 77.6 | 57.6 | 68.3 | 97.0 | 87.7 | 72.7 | 84.7 |
| PEG 600 | 30.6 | 36.2 | 30.4 | 21.2 | 39.7 | — | — | 9.5 | 24.2 | 12.1 |
| AMM | — | — | — | — | — | — | — | — | — | — |
| Catalyst** | .5 | .4 | 1.1 | 1.0 | 2.5 | 1.0 | 2.7 | 2.5 | 1.4 | 1.4 |
| Surfactant*** | .2 | .2 | .2 | .2 | .2 | .2 | .1 | .1 | .3 | .3 |
| Grit | — | — | — | — | — | — | — | — | 1.5 | 1.5 |
| PEG 1000/1500 38/25 Ratio | — | — | — | — | — | 30.5 | — | — | — | — |
| CMC-7H | — | — | — | — | — | — | .2 | .2 | — | — |
| Paper - Decor | Teak | Teak | Brown | Brown | Brown | Brown | Brown | Brown | Oak | Oak |
| Resin Content % | 52.7 | 50.7 | 59.1 | 59.1 | 57.2 | 57.1 | 58 | 58.5 | 54.8 | 54.7 |
| Volatile Content % | 4.2 | 4.3 | 5.1 | 5.6 | 4.8 | 4.8 | 7.8 | 6.2 | 5.8 | 4.4 |
| Continuous laminating | | | | | | | | | | |
| FPM | 18 | 18 | 18 | 18 | 18 | 18 | Simulated in flat Bed Press 20 Sec at 180° C. | | 30 | 30 |
| Top Belt Temp. °C. | 180 | 180 | 180 | 180 | 180 | 180 | | | 170 | 170 |
| Cushion Temp. °C. | 180 | 180 | 180 | 180 | 180 | 180 | | | 195 | 195 |
| Bottom Belt Temp. °C. | 180 | 180 | 180 | 180 | 180 | 180 | | | 185 | 185 |
| Pressure (Bar) | 14 | 14 | 14 | 14 | 14 | 14 | | | 14 | 14 |
| Laminate | | | | | | | | | | |
| Appearance | OK | OK | OK | OK | Hazy | Hazy | OK | OK | Hazy | OK |
| WA % | 14.8 | 13.4 | 12.4 | 12.4 | — | — | — | — | — | — |
| TS % | 12.2 | 12.4 | 10.2 | 7.6 | — | — | — | — | — | — |
| Appearance (After Boil) | OK | Discolor | Blistered | OK | — | — | — | — | — | — |
| Teapot | Mod 1 | NT | Mod 1 | Mod 1 | — | — | NE | Mod 1 | Ext 1 | Mod 1 |
| Steam (DIN) | Discolor | NT | Discolor | NT | — | — | NE | Discolor | NT | NT |
| NEMA Stains | — | — | — | — | — | — | — | — | Ext # 29 | NE |

| Example No. | 14C | 15C | 16 | 17 | 18 | 19 | 20 |
|---|---|---|---|---|---|---|---|
| Resin Solid % | | | | | | | |

TABLE II-continued

|  | | | | | | | |
|---|---|---|---|---|---|---|---|
| MF | 68 | 68 | 52.9 | 52.9 | 52.8 | 53.4 | 42.2 |
| PEG 600 | 30.2 | 30.2 | 29.9 | 29.9 | 29.8 | 19.2 | 24.2 |
| AMM | — | — | 15.2 | 15.2 | 15.2 | 24.2 | 30.5 |
| Catalyst | 1.6 | 1.6 | 1.6 | 1.6 | 1.6 | 1.4 | 1.4 |
| Surfactant | .2 | .2 | .3 | .3 | .3 | .3 | .3 |
| Grit | — | — | — | — | 1.6 | 1.6 | 1.5 |
| Paper | Brown | Brown | Brown | Brown | Oak | Oak | Oak |
| Resin content | 57.0 | 53.6 | 55.3 | 50.9 | 58.8 | 58.9 | 58 |
| Volatiles | 4.3 | 5.3 | 5.6 | 4.8 | 5.0 | 6.2 | 5.6 |
| Continuous Laminating | | | | | | | |
| FPM | 27 | 27 | 27 | 27 | 30 | 30 | 30 |
| Top Belt °C. | 170 | 170 | 170 | 170 | 170 | 170 | 170 |
| Cushion Temp °C. | 195 | 195 | 195 | 195 | 195 | 195 | 195 |
| Bottom Belt °C. | 195 | 195 | 195 | 195 | 185 | 185 | 185 |
| Pressure (Bar) | 14 | 14 | 14 | 14 | 14 | 14 | 14 |
| Laminate | | | | | | | |
| Appearance | OK | OK | OK | OK | OK | OK | OK |
| WA % | 10.8 | 9.2 | 8.6 | 8.3 | 15.3 | 16.5 | 16.2 |
| TS % | 8.9 | 11.5 | 8.9 | 9.7 | 11.7 | 10.1 | 5.7 |
| App. (After boil) | OK | OK | OK | OK | OK | OK | OK |
| Teapot | Ext 1 | Ext 1 | NE | NE | Sl | NE | SL |
| Steam (DIN) | Discolor | Discolor | Discolor | Discolor | NT | NT | NT |
| Stain | — | — | — | — | NE | NE | NE |

NE = No effect
NT = Not tested
CMC = Carboxymethyl cellulose
AMM = alkylated methylolmelamine
1 Discolor, Mod = moderate, EXT = extreme, Surface turned milky

| TEST METHODS FOR LAMINATE PROPERTIES | |
|---|---|
| Impact Resistance | NEMA LD3-3.03 |
| Steam Test (DIN 53799-4.11) | 150 4586/2-Clause 24 (proposed) |
| Boiling Water Resistance | NEMA LD3-3.05 |
| Conductive Heat Resistance | NEMA LD3-3.08 |
| Light Resistance | NEMA LD3-3.10 |
| Stain Resistance | NEMA LD3-3.09 |
| Stain Resistance | ISO-4586/2 - 15 |
| Crack Resistance ISO-4586/2 - 13 | |

EXAMPLES 21-25

Polyethylene glycol, five parts by weight, having a molecular weight of about 600 is modified by reacting with one part by weight of a commercially available partially methylated trimethylolmelamine. The reaction is conducted at 100° C. for 3½-4 hours in the presence of p-toluenesulfonic acid in isopropanol as catalyst. A clear, viscous liquid, which is soluble in water results.

The reaction product is added at two levels to a melamine/formaldehyde resin (M/F=1.65). The resultant blend is catalyzed with a 1% addition of a 40% solution of p-toluenesulfonic acid in isopropanol. For comparison, a blend of the same polyethylene glycol and partially methylated trimethylolmelamine (unreacted) is added at two levels to the same melamine/formaldehyde resin and identically catalyzed. Also for comparison, the same melamine/formaldehyde resin is identically catalyzed to make a fifth resin composition. Each composition is used to separately impregnate a commercially available decor sheet. Resultant impregnated sheets are thermally analyzed using a Dupont Mechanical Analyzer. Sections of each impregnated sheet are pressed in a flat bed press at 9.6 MPa for 45 minutes at 145° C. and then cooled to room temperature. Resultant pressed sheets are then examined for color and steam resistance.

Each resin composition is also coated onto a glass slide and dried. After drying each coated glass slide is baked for two hours at 120° C. Resulting cured films are then examined for gloss, shrinkage and clarity. Results are set forth in Table III.

TABLE III

| Example | 21C | 22 | 23 | 24 | 25 |
|---|---|---|---|---|---|
| % Additives on Solids | 0 | 24 | 24 | 39 | 39 |
| Was additive pre-reacted | — | yes | no | yes | no |
| Clarity of pressed sheet | ok | ok | SL,Cloudy | ok | SL,Cloudy |
| 10' Steam on pressed sheet | NE | NE | No change | NE | No change |
| Clarity on glass slide | ok | ok | ok | ok | ok |
| Shrinkage on glass side | Sev** | None | Slt | None | None |
| Film gloss on glass side | Hi | Hi | Hi | Hi | Low |
| R.T. Modulus (GPa)* | 2.2 | 2.9 | 2.4 | 2.7 | 2.5 |
| Total time to cure (min)* | 6.5 | 11 | 11 | 12 | 11 |

*From Thermal analysis of the impregnated sheets using a Dupont Mechanical Analyzer.
**Shattered and flaked off upon cooling.

EXAMPLE 26

The procedure of Example 19 is again followed except that the resin used to impregnate the kraft core sheet is a 70/30 blend of a phenol/formaldehyde resin (1:1.8) and a melamine/formaldehyde resin (1:2.1) and the pressure in the continuous laminating machine is 4.0 MPa. Similar results are achieved.

EXAMPLE 27

Again following the procedure of Example 19 except that the core substrate comprises 8 sheets of kraft paper impregnated with a standard resole phenolic resin and the heat and pressure consolidation is conducted at 1400 9.7 MPa at 800°, an excellent laminate is recovered.

We claim:

1. A cellulosic paper sheet impregnated with from about 15% to about 80%, by weight, based on the weight of the paper sheet, of a composition comprising a blend of (1) from about 35% to about 98%, by weight, based on the total solids of the composition, of a melamine/formaldehyde resin having a ratio of formaldehyde to melamine of from about 1.1:1 to about 3:1, respectively, and (2) from about 2% to about 65%, by weight, based on the total solids of the composition, of a mixture of (A) a polyalkylene glycol having the formula

wherein x is an integer of 2-4, inclusive, and n is an integer such that the glycol has a weight average molecular weight of from about 200 to about 1200 and, (B) an alkylated methylolmelamine having the formula

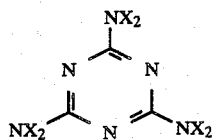

wherein each X is, individually, hydrogen or $CH_2OR$, R is hydrogen or an alkyl group of 1-4 carbon atoms, inclusive, at least 2 X's are $CH_2OR$, and at least one R is an alkyl group, the ratio of A:B ranging from about 2.5:1 to about 0.3:1, respectively, (C) from about 0% to about 3%, by weight, based on the total solids of the composition, of an acid catalyst, (D) from about 0% to about 0.5%, by weight, same basis, of a surfactant, (E) from about 0% to about 2.0%, by weight, same basis, of an abrasive material and (F) from about 0% to about 4.0%, by weight, same basis, of a flow promotor.

2. An impregnated cellulosic paper sheet according to claim 1 wherein x is 2.

3. An impregnated cellulosic sheet according to claim 1 wherein n is an integer such that the glycol has a weight average molecular weight of about 600.

4. An impregnated cellulosic sheet according to claim 1 wherein (B) is a partially methylated trimethylolamine.

5. A heat and pressure consolidated laminate comprising (I) a cellulosic substrate;
(II) a cellulosic decor sheet, and, optionally
(III) a cellulosic overlay sheet wherein at least one of (II) and (III) is a cellulosic paper sheet impregnated with from about 15% to about 80%, by weight, based on the weight of the paper sheet, of a composition comprising a blend of (1) from about 35% to about 98%, by weight, based on the total solids of the composition, of a melamine/formaldehyde resin having a ratio of formaldehyde to melamine of from about 1.1:1 to about 3:1, respectively, and (2) from about 2% to about 65%, by weight, based on the total solids of the composition, of a mixture of (A) a polyalkylene glycol having the formula

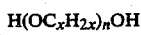

wherein x is an integer of 2-4, inclusive, and n is an integer such that the glycol has a weight average molecular weight of from about 200 to about 1200 and, (B) an alkylated methylolmelamine having having the formula

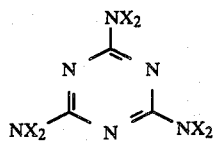

wherein each X is, individually, hydrogen or $CH_2OR$, R is hydrogen or an alkyl group of 1-4 carbon atoms, inclusive, at least 2 X's are $CH_2OR$, and at least one R is an alkyl group, the ratio of A:B ranging from about 2.5:1 to about 0.3:1, respectively, (C) from about 0% to about 3%, by weight, based on the total solids of the composition, of an acid catalyst, (D) from about 0% to about 0.5%, by weight, same basis, of a surfactant, (E) from about 0% to about 2.0%, by weight, same basis, of an abrasive material and (F) from about 0% to about 4.0%, by weight, same basis, of a flow promotor.

6. A laminate according to claim 5 wherein (I) comprises a plurality of resin impregnated kraft paper sheets.

7. A laminate according to claim 5 wherein (II) is an impregnated sheet as described therein.

8. A laminate according to claim 5 wherein (I) is an airlaid fibrous web.

9. A laminate according to claim 5 wherein (III) is an impregnated overlay sheet as described therein.

10. A laminate according to claim 5 wherein (I) is a plurality of kraft paper sheets impregnated with a blend of phenol resin and a melamine/formaldehyde resin.

* * * * *